United States Patent Office

3,245,966
Patented Apr. 12, 1966

3,245,966
POLYMERIZATION OF ETHYLENE IN THE PRESENCE OF $TiCl_2$ WHICH HAS BEEN ACTIVATED BY GRINDING
Donald F. Hoeg, Mount Prospect, Ill., and Frank X. Werber, Rockville, and Walter R. Wszolek, Ellicott City, Md., assignors to W. R. Grace & Co., New York, N.Y., a corporation of Connecticut
No Drawing. Filed Mar. 5, 1962, Ser. No. 177,248
12 Claims. (Cl. 260—88.2)

This invention is directed to polymerizing ethylene and mixtures of ethylene with propylene, butene-1, and trans-butene-2 in the substantial absence of contaminants or inhibitors such as moisture, oxygen, acetylene, acetone, hydrogen sulfide, and the like, under moderate pressures in the presence of a catalyst made by grinding titanium dichloride in an inert medium similarly free of contaminants. It is essential that the grinding be continued until the surface area of the ground $TiCl_2$ is in the range of about 10–30 square meters per gram, as measured by, for example, the well-known mixed helium-nitrogen absorption technique, Nelson, F. M., and Eggertsen, F. T., Anal. Chem., 30, p. 1387 (1958).

The catalyst so prepared has been found to be much more active in olefin polymerization than titanium dichloride that has not been so prepared. The reason for the increased activity is not fully known. It appears, however, that the freshly fractured surfaces of the ground particles are extremely active if not allowed to come in contact with moisture, oxygen, or certain other "poisons," and that such surfaces may account for the increase in activity. It further appears that this increase cannot be accounted for by an increase in surface area.

The $TiCl_2$ catalyst so prepared is useful in making high-molecular weight polymers from ethylene-rich feed streams. It is operable at temperatures ranging from room temperature up to 300° C. and higher, and at pressures from a few atmospheres, e.g., 100 p.s.i.g., to 5000 p.s.i.g., and even higher. For practical operation, however, temperatures in the range of 50–270° C. and pressures of 200 to 600 p.s.i. are suitable.

The polymerization reaction is operable with or without a solvent. If a solvent is used, it should be one which is liquid under the conditions of temperature and pressure used, and which contains no contaminants as aforesaid. Hydrocarbon solvents are preferred, e.g., pentane, hexane, heptane, cyclohexane, octane, benzene, xylene, toluene, and the like.

The amount of catalyst is not critical. Relatively small amounts are operable to form relatively large amounts of polymer. In general, a practical range is 0.001 to 1 g. of catalyst per gram of olefin polymerized. Even larger amounts are operable, but unnecessary.

The following examples illustrate the invention, but do not limit it.

EXAMPLE 1.—GRINDING $TiCl_2$ CATALYST

Into a 1-liter stainless steel jar containing about half its bulk volume of ½-inch stainless steel balls was placed about 100 g. of commercial $TiCl_2$.

The ball-milling was carried out under very pure, thoroughly dried argon for nine days. The rolls were rotated at about 200–300 r.p.m. The ball-mill was removed from the rolls from time to time and opened in a dry box maintained under a slight pressure of argon, and the product was sampled. Aliquots of each such sample were analyzed for $TiCl_2$, $TiCl_3$, and free Ti; the surface area was determined; and the sample was used in a polymerization run and its activity determined.

The material before milling was black and had a granular crystalline appearance. After milling it was still black, but had a soft amorphous appearance. In general, after milling, it is extremely pyrophoric.

It is essential that the $TiCl_2$ be ground in the substantial absence of oxygen, moisture, and similar contaminants, e.g., CO, acetylene, $NH_3$, and ethers, ketones, and other oxygen-containing organic materials. (Olefins and saturated hydrocarbons, however, are not contaminants.) In addition to argon, we have found that "lamp-grade nitrogen," e.g., nitrogen of a purity suitable for filling light bulbs, is suitable. Also suitable are the other noble gases (pure), especially helium, and neon. The same precautions against contaminants applicable in milling also apply to handling, storing, and using the milling material.

Throughout this specification it will be understood that all samples of activated $TiCl_2$ are weighed and added to the autoclave under inert conditions equivalent to the conditions of activation as regards freedom from contaminants.

EXAMPLE 2.—SYNTHESIS OF POLYETHYLENE WITH GROUND $TiCl_2$

Using the aforesaid precautions, 1.46 g. $TiCl_2$ ball-milled five days under argon to give a surface area of about 27 square meters per gram was placed in a 1-liter stainless steel autoclave equipped with stirrer, thermowell, rupture disc, a ball valve serving as catalyst inlet, and an inlet for charging solvent and gases. Next, 300 cc. of pure, dry cyclohexane (solvent) was added. The stirrer was then turned on, and the autoclave was heated to about 150° C. Then the autoclave was connected to the ethylene tank, pressured to 470 p.s.i.g., and maintained under this ethylene pressure throughout the run. The ethylene used was likewise very dry and quite pure.

The run proceeds (typically) at a temperature ranging between about 150° and about 195° C. Considerable variation in temperature is, however, possible in using activated $TiCl_2$. After 17 minutes the run was stopped and the autoclave was cooled (to below the boiling point of the solvent), and was then vented and opened. The polyethylene-containing reaction slurry in cyclohexane was then transferred to a liter beaker. At this stage the product was black, owing to the $TiCl_2$ content.

If desired, the crude material may be purified and recovered by techniques well known in the art. For example, the material may be refluxed with alcoholic acids, e.g., HCl-methanol, followed by filtration and drying.

The product purified as above was found to weigh 50.5 g., with a density of 0.9490.

Using the well known formula for determining catalyst activity (grams of polymer/grams of catalyst/per hour) it will be seen that this particular catalyst has an activity of $50.6 \div 1.46 \div 17/60 = 122.0$.

In a comparable run, using $TiCl_2$ that had not been ball-milled, and having a screen analysis such that over 60% passed a 60 mesh screen, 1.18 g. of such catalyst was used for 1 hour with a yield of 3 g. of polyethylene. The catalyst activity was therefore $$\frac{3}{1.18 \times 1} = 2.5$$

Since the yield was smaller and the amount of catalyst and the reaction time greater, it is clear that ball-milling gives a much more active catalyst. In another control run (at a lower temperature) 1.86 g. of finely divided $TiCl_2$ of commerce, not ground under inert conditions, was used as the catalyst to polymerize ethylene in cyclohexane at 120–130° C. under 450 p.s.i.g. for 3¼ hours. The yield of polyethylene was 5 g. The catalyst activity was therefore $$\frac{5}{1.86 \times 3.25} \text{ or } 0.83$$

Further runs carried out using the activated $TiCl_2$ of this invention and substantially the same techniques of Example 2 above are summarized in Table I, below. The solvent in each case was toluene (1.66 lb.). The catalyst was $TiCl_2$ ball-milled 119 hours under argon, and it had a surface area of substantially 27 square meters per gram.

Table I

| Example No. | Catalyst, g. | Temp., °C. | Press., p.s.i. | Time, mins. | Polyethylene G. | Density | Catalyst activity |
|---|---|---|---|---|---|---|---|
| 2 | 1.46 | 150–195 | 470 | 17 | 50.5 | 0.9490 | 122.0 |
| 3 | 1.22 | 180–224 | 490 | 30 | 89.5 | 0.9472 | 147.0 |
| 4 | 1.5 | 190–220 | 480–500 | 40 | 94.5 | 0.9452 | 94.5 |
| 5 | 1.06 | 248–262 | 480–490 | 23 | 26.7 | 0.9576 | 65.6 |
| 6 | 1.15 | 151–184 | 480 | 20 | 51.8 | 0.9514 | 135.0 |

EXAMPLE 6.—ETHYLENE/PROPYLENE COPOLYMERIZATION

As already mentioned, the milled $TiCl_2$ catalyst is also effective with ethylene-propylene mixtures. E.g., using the general procedure of Example 2, 1.32 g. of the same $TiCl_2$ (ball-milled five days under argon), 300 ml. purified cyclohexane, and 22 ml. liquid propylene was placed in the autoclave, which was then sealed and heated to 145° C. When it reached this temperature it was pressured with ethylene to 450 p.s.i. The polymerization was run at 140° C. for 32 minutes, after which the autoclave was vented, cooled, and the polymer recovered. The purified polymer had a density of about 0.93 and a propylene content of about 6% (by infra-red measurement). On pressing it gave a rubbery film.

EXAMPLE 7.—ETHYLENE/PROPYLENE COPOLYMERIZATION

The general procedure of Example 2 was used, with 11.3 ml. propylene in the autoclave. The catalyst (same as in Example 2) weighed 0.95 g. The solvent was 0.66 lb. toluene. Reaction time, one hour at 160–185° C., with 450 p.s.i. ethylene pressure. Yield of copolymer, 131.4 g.; density, 0.9360; catalyst actiivty, 138.

Other runs were made using varying amounts of propylene. In general, about half of the mole percent of propylene in the monomer feed is incorporated into the copolymer, as mole percent propylene in the copolymer.

EXAMPLE 8.—ETHYLENE/BUTENE-1 COPOLYMER

The run was made in a 1-liter vertical stirred autoclave. The catalyst was 1.06 g. $TiCl_2$ ball-milled five days in argon, and had a surface measurement of about 27 square meters per gram. The solvent was 0.66 lb. toluene. Twenty ml. butene-1 was added, and the autoclave heated to 175° C. and pressured to about 425 p.s.i. with ethylene. It was repressured to this pressure from time to time during the ensuing one hour run. The product was worked up and found to weigh 61.7 g., density 0.9175, giving a catalyst activity of 112. Analysis showed that about 2.1 mole percent butene-1 was incorporated into the copolymer.

EXAMPLE 9.—COPOLYMER OF ETHYLENE/TRANS-BUTENE-2

The run was made by the general procedure of the two preceding examples. The catalyst was the same, 0.91 g. of $TiCl_2$ ball-milled under argon five days, to give a surface area of 27 square meters per gram. Forty-five ml. trans-butene-2 was added. Ethylene was pressured into the autoclave at 455–470 p.s.i., and repressured from time to time during the one hour run. Reaction temperature was 154–186° C. Yield, 62.8 g. copolymer; density, 0.9466. Catalyst activity, 138.0. The copolymer showed 1.1 ethyl branches per thousand carbons, by infra red determination, equivalent to 0.2 mole percent trans-butene in the copolymer. The copolymer was 8% soluble in boiling n-heptane.

When preparing copolymers of ethylene with the aforesaid co-monomers, the co-monomer can be added to the ethylene in amounts up to about 20 mole percent of the total feed.

EFFECTS OF GRINDING $TiCl_2$

There are certain curious changes in the $TiCl_2$ mass on ball-milling.

Firstly, the surface area (square meters per gram) increases, rapidly at first, then more slowly, reaching a peak at about 1–5 days, more or less, depending somewhat on hardness of apparatus, load, milling rate, etc. Ordinarily, this "area" peak does not correspond with catalyst activity peak, which generally occurs well before the area peak. After the area peak is reached, further milling causes a gradual decline in area. With this area decline, activity also declines, and may drop surprisingly after the 6th day of milling.

Accordingly, we consider it essential that the grinding be continued until the surface area reaches at least 10 square meters per gram. Under ordinary conditions this condition is reached in about one day of ball-milling. Generally speaking, it can be reached sooner if the mill is run somewhat faster, or may be delayed if the mill is run somewhat more slowly. As the grinding progresses, the surface area reaches a maximum of about 25–30 square meters per gram, typically at about the 5th day of normal milling. Thereafter, continued milling causes the area to decrease. When it decreases below about 17 square meters per gram, its activity is markedly reduced. Therefore, while the surface area range for which the catalyst is most effective extends from 10 to 30 square meters per gram, it must be understood that if the surface is 10–17 square meters per gram, this was reached in the initial phases of grinding, and not as a result of further grinding after the maximum surface (e.g., 25–30 meters.$^2$/gram) was reached and passed. For any given example having a surface area in the 10–17 square meters range, it may readily be determined whether it has or has not been ground through its maximum surface simply by analyzing for $TiCl_2$. If it has not been ground through its maximum area, the $TiCl_2$ will be at least about 45 weight percent. If it has been ground through its maximum, such $TiCl_2$ (surface area 10–17 meters$^2$/g.) will have a $TiCl_2$ content of about 35% or less. (This change in chemical composition will be discussed in more detail below.)

Another important change in the $TiCl_2$ caused by grinding is the development of a new crystalline phase for the $TiCl_2$.

The X-ray powder pattern of the technical grade titanium dichloride (e.g., prepared by heating together $TiCl_3$ and Ti metal) shows a diffraction spectrum almost identical to that described for pure $TiCl_2$. We shall call the structure represented by this pattern Phase A. Upon milling technical grade $TiCl_2$ for about one day, a new crystalline phase (Phase B) appears, whose diffraction pattern does not closely resemble any of the published patterns for either the di- or trichloride. After five days' milling, Phase A is completely gone and B is the only one visible. For good catalyst activity, a substantial proportion of the $TiCl_2$ must be in the form of this new Phase B.

No evidence for crystalline, metallic titanium can be found. In fact, the metallic residue from the milled samples (after dissolution) of the halides, was shown to be amorphous by separate X-ray examination. Based on the above, we conclude that the milling process brings about a migration of titanium ions within the $TiCl_2$ lattice. These aggregate to form amorphous titanium metal, leaving holes behind. Accordingly, the structure of Phase B is apparently caused by a slight shift in the inter-layer Ti to Ti distance, due to a change in stacking order of adjacent layers, brought about by the formation of holes in the original $TiCl_2$ (Phase A) structure.

As has already been mentioned, grinding causes a change in the chemical composition of the $TiCl_2$, viz., the $TiCl_2$ slowly disproportionates to $TiCl_3$ and Ti, according to the following equation:

$$3TiCl_2 \rightarrow 2TiCl_3 + Ti$$

Referring to Table II, it will be evident that the decrease in $TiCl_2$ and the increase in $TiCl_3$ and Ti can be accounted for by the mechanism of the foregoing equation. The catalyst activities in the table were determined by using the catalyst to polymerize ethylene by the general procedure of Example 2.

(Incidentally, it may be here noted that the $TiCl_2$ of commerce, being generally made from $TiCl_3$ and Ti, may be expected to contain small amounts of these two materials.)

The reasons why grinding $TiCl_2$ increases its activity as a polyethylene catalyst are not clearly understood. As shown in Table II, the surface area of the catalyst is increased by grinding, as may be expected. However, it is equally clear that activity is not a simple function of surface area. For example, the surface area of the catalyst of Example 13 is 27 square meters per gram, with an activity of 93.7, whereas the surface area of the catalyst of Example 11 is only 10.7, but with an activity of 121.2. Also, in comparing the catalysts of Examples 10 and 1, it is noted that increasing the surface area by a factor of 3–5 increases the activity by a factor of about 70. In considering the $TiCl_2$ content of the ground catalysts, it will be observed that activity is roughly correlated to the percentage of $TiCl_2$ in the catalyst. On the other hand, the percent of $TiCl_2$ in a ground catalyst is always less than that in an unground catalyst owing to the disproportionation reaction above discussed, and yet the unground catalyst is much less active than the ground catalyst.

TABLE II
PHYSICAL AND CHEMICAL CHANGES OCCURRING WHILE BALL-MILLING $TiCl_2$

| Exam. No. | Days milled (under argon) | Percent $TiCl_2$ | Percent $TiCl_3$ | Percent Ti | Catalyst activity | Surface area, m.²/gm. |
|---|---|---|---|---|---|---|
| 10 | 0 | 87.5 | 6.8 | 1.4 | 1.70 | 2–3 |
| 11 | 1 | 76.7 | 16.7 | 2.4 | 121.2 | 10.7 |
| 12 | 4 | 46.5 | 41.5 | 6.3 | 94.0 | 16.2 |
| 13 | 5 | 45 | 44.4 | 7.7 | 93.7 | 27.0 |
| 14 | 6 | 39 | 50.3 | 7.8 | 72.2 | 10.8 |
| 15 | 9 | 25.3 | 61.2 | 10.1 | 16 | 15.5 |

The two following examples provide more complete working data for the catalysts of Examples 10 and 11.

EXAMPLE 10 (CONTROL)

Following the procedure of Example 2, 0.71 gram of unground $TiCl_2$ catalyst was placed in the autoclave with 0.66 pound of toluene. The polymerization temperature was 148–166° C., the pressure was 475–540 p.s.i., the reaction time was one hour and three minutes, and the yield of solid polyethylene was 1.3 grams.

EXAMPLE 11

Following the procedure of the preceding example, 1.08 grams of the catalyst was used, the polymerization temperature being 154–168° C., the pressure 420–450 p.s.i., the reaction time 30 minutes, and the yield 65.5 grams. The solvent was 0.66 pound toluene.

The uses of the polyolefins of this invention are analogous to those prepared by prior art procedures. The solid polymers can be used to make moldings, film, filament, pipe, tubing and the like, using substantially the same equipment and technique customary for the solid polyolefins of the prior art.

This application is a continuation-in-part of our copending application, Serial No. 831,719, filed August 5, 1959, now abandoned, which in turn is a continuation-in-part of our application, Serial No. 687,614, filed October 2, 1957, now abandoned.

We claim:

1. In the method of polymerizing feed which is a member of the group consisting of ethylene and mixtures of ethylene with a member of the group consisting of propylene and a butene with finely divided $TiCl_2$ catalyst, in an inert diluent at superatmospheric pressure, the improvement comprising activating the $TiCl_2$ before use by grinding it in an inert atmosphere until the surface area is 10–30 square meters per gram and discontinuing the grinding before the $TiCl_2$ content of the catalyst drops below 35 weight percent.

2. The method according to claim 1 in which the grinding is continued until the surface area of the catalyst is 25–30 square meters per gram.

3. The method according to claim 1 in which the polymerization is carried out at a temperature in the range 50–270° C. and at a pressure of 200–600 p.s.i.

4. The method according to claim 3 in which the feed is ethylene.

5. The method according to claim 3 in which the feed is a mixture of ethylene with a co-monomer which is a $C_3$–$C_4$ olefin.

6. The method according to claim 5 in which the co-monomer is propylene.

7. The method according to claim 5 in which the co-monomer is a butene.

8. The method according to claim 7 in which the co-monomer is butene-1.

9. The method according to claim 7 in which the butene is trans-butene-2.

10. The method according to claim 1 in which the diluent is a hydrocarbon.

11. The method according to claim 1 in which the $TiCl_2$ before grinding consists essentially of 87.5% $TiCl_2$, 6.8% $TiCl_3$, and 1.4% Ti, and after grinding consists essentially of 39–76.7% $TiCl_2$, 16.7–50.3% $TiCl_3$, and 2.4–7.8% Ti.

12. The method according to claim 1 in which the $TiCl_2$ after grinding consists essentially of about 76.7% $TiCl_2$, 16.7% $TiCl_3$, and 2.4% Ti, and has a surface area of about 10.7 meters² per gram.

References Cited by the Examiner

UNITED STATES PATENTS 2,893,984 7/1959 Seelbach _____ 260—93.7
2,899,416 8/1959 Schreyer _____ 260—93.7

FOREIGN PATENTS 1,132,506 11/1956 France.
778,639 7/1957 Great Britain.

JOSEPH L. SCHOFER, Primary Examiner.

JAMES SEIDLECK, Examiner.